(12) United States Patent
Dearing et al.

(10) Patent No.: US 7,716,305 B2
(45) Date of Patent: May 11, 2010

(54) APPARATUS, SYSTEM, AND METHOD FOR PRESERVING CLUSTER LEVEL SERIALIZATION DURING FILE SERVER SERIALIZATION REINITIALIZATION

(75) Inventors: Gerard Maclean Dearing, San Jose, CA (US); William Stuart Edwards, San Jose, CA (US); Elmer Enrique Latorre, San Jose, CA (US); Thomas Alexander Mahon, San Jose, CA (US); Lyle LeRoy Merithew, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1461 days.

(21) Appl. No.: 10/931,914

(22) Filed: Sep. 1, 2004

(65) Prior Publication Data

US 2006/0047828 A1 Mar. 2, 2006

(51) Int. Cl.
*G06F 15/16* (2006.01)

(52) U.S. Cl. .......................... 709/219; 709/222; 707/8; 714/7

(58) Field of Classification Search ................ 709/219, 709/222; 707/8; 714/7
See application file for complete search history.

(56) References Cited

U.S. PATENT DOCUMENTS

| | | | | |
|---|---|---|---|---|
| 5,202,971 A | * | 4/1993 | Henson et al. | 707/8 |
| 5,280,619 A | * | 1/1994 | Wang | 710/200 |
| 5,504,900 A | * | 4/1996 | Raz | 707/10 |
| 6,115,710 A | * | 9/2000 | White | 707/10 |
| 6,151,655 A | * | 11/2000 | Jones et al. | 710/244 |
| 6,665,814 B2 | | 12/2003 | Hobson et al. | 714/16 |
| 6,920,467 B1 | * | 7/2005 | Yoshimoto | 707/202 |
| 2002/0066051 A1 | | 5/2002 | Hobson et al. | 714/16 |
| 2002/0078239 A1 | * | 6/2002 | Howard et al. | 709/245 |
| 2004/0015834 A1 | | 1/2004 | Mestre et al. | 717/106 |
| 2004/0064439 A1 | * | 4/2004 | Hinshaw et al. | 707/1 |

OTHER PUBLICATIONS

Bernstein, P.A., et al., "Non-Locking Schedulers," In Concurrency Control and Recovery in Database Systems, (USA: Addison-Wesley Publishing Company), pp. 113-142 (1987).*

(Continued)

*Primary Examiner*—Thu Nguyen
*Assistant Examiner*—Thomas J Dailey
(74) *Attorney, Agent, or Firm*—Kunzler Needham Massey & Thorpe

(57) ABSTRACT

An apparatus, system, and method are disclosed for preserving cluster level serialization during file server serialization reinitialization. The apparatus includes a permission request module, a cluster negotiation module, and a completion notification module. The permission request module communicates a permission request to a remote file server in anticipation of a reinitialization of a local file server. The cluster negotiation module implements a reinitialization protocol on the remote file server during the reinitialization of the local file server. The completion notification module notifies the remote file server when the reinitialization of the local file server is complete. The apparatus, system, and method beneficially facilitate continued serialization negotiation among the remote file servers during the reinitialization of the serialization data on the local file server and, thereby, preserve the integrity of shared data resources.

19 Claims, 7 Drawing Sheets

OTHER PUBLICATIONS

Minwen Ji, "Atomicity, serialization and recovery in the island-based file sytem", INSPEC - 6806009; Proceedings IEEE International Conference on Cluster Computing. CLUSTER 2000, pp. 369-370, Published: Los Alamitos, CA, USA, 2000.xxvii + 406 pp.

Sandoz A, "Achieving high availability in a replicated file system by dynamically ordering transactions", INSPEC -3908329; Proceedings. The 10$^{th}$ International Conference on Distributed Computing Systems (Cat. No. 90CH2878-7), pp. 432-439, Published: Los Alamitos, CA, USA, 1990, xxi + 600 pp.

Gronvall G; Westerlund A; Pink S, "The design of a mulicast-based distributed file system", INSPEC - 6231025; Operating Systems Review, spec. issue., pp. 251264, Winter 1998.

* cited by examiner

300

320

APPARATUS, SYSTEM, AND METHOD FOR PRESERVING CLUSTER LEVEL SERIALIZATION DURING FILE SERVER SERIALIZATION REINITIALIZATION

BACKGROUND OF THE INVENTION

1. Field of the Invention

This invention relates to file servers and more particularly relates to preserving cluster level serialization while reinitializing serialization data in a file server in response to a serialization failure.

2. Description of the Related Art

Serialization of a plurality of data access requests can be extremely complicated for data storage devices that are shared among multiple-processor file system servers. Serialization of the data access requests involves defining which applications are connected to which storage devices, or portions thereof, and what kind of access is provided for each application. For example, some applications are given exclusive access rights for certain write operations, while others may not receive exclusive access. Also, some applications may receive shared access rights for certain read operations on the shared data storage devices. By defining which applications are allowed which type of access at which times, the file system servers are able to prevent many data operation errors that would otherwise occur.

However, serialization techniques are not perfect and a serialization implementation may fail. A serialization failure may occur when read or write access to a requested data file or directory is not made available to a requesting application. For example, a serialization failure may occur when two applications are requesting data access rights to data that is exclusively assigned to the other application.

FIG. 1a shows one example of an application environment 10 in which a serialization conflict might occur. In particular, the illustrated application environment 10 includes a first application 12 and a second application 14. The first application 12 has exclusive rights (as shown by the solid arrow 16) to a first data file 18. Likewise, the second application 14 has exclusive rights (as shown by the solid arrow 20) to a second data file 22.

FIG. 1a also shows the first application 12 requesting access rights (as shown by the dashed arrow 24) to the second data file 22. Likewise the second application 14 may request access rights (as shown by the dashed arrow 26) to the first data file 22. In this case, a serialization "deadlock" failure occurs when neither the first application 12 nor the second application 14 can progress until the requested access rights are granted, but the requested access rights cannot be granted because the requested data files 18, 22 are already in use by the non-requesting applications 12, 14. When this type of serialization failure occurs, the file system server (not shown) may become nonresponsive and thereby unavailable because the applications 12, 14 continue to hold onto their existing access rights while requesting the additional access rights.

Although an internal serialization failure, by itself, does not compromise either the integrity of the data stored in the data files 18, 22 or the run-time states of the in-flight applications 12, 14, such a serialization failure can have drastic effects on the file system server. For instance, a serious serialization failure may occur where the file system is central to an operating system, such as when the ability to load programs from a file system is necessary for basic operating system functions. Furthermore, serialization failures can result in operating system outages, which can cause the failure of all in-flight application processing, including processing that is not directly related to the corresponding file system. Additionally, serialization failures may lead to excessive costs due to file system server downtime that impacts business-critical applications.

With regard to file system serialization failures, the conventional focus is on correcting the underlying causes of all serialization problems. However, this solution is practically infeasible given the complexity of contemporary multitasking, multiprocessing, and clustering environments in which the number of possible serialization problems and causes is overwhelming.

Because conventional serialization management schemes typically solve serialization failures by restarting the file server, conventional techniques also fail to address how to maintain cluster level serialization data during the reinitialization of the file server. Rather, conventional serialization management schemes allow open file connections and other resource connections to fail while the file server is down. Furthermore, conventional serialization management schemes fail to recognize and preserve continuing data access rights of the file server that is being reinitialized.

From the foregoing discussion, it should be apparent that a need exists for an apparatus, system, and method for preserving cluster level serialization data during file server serialization reinitialization in a manner to overcome the disadvantages of conventional technology. Beneficially, such an apparatus, system, and method would preserve data access rights of the reinitialized file server while the file system serialization information is reinitialized. Additionally, such an apparatus, system, and method would be advantageous over conventional systems and methods providing automated reinitialization negotiation among the file servers within a cluster without risking the integrity of shared data resources within the cluster.

SUMMARY OF THE INVENTION

The present invention has been developed in response to the present state of the art, and in particular, in response to the problems and needs in the art that have not yet been fully solved by currently available file system servers. Accordingly, the present invention has been developed to provide an apparatus, system, and method for preserving cluster level serialization during file server serialization reinitialization that overcome many or all of the above-discussed shortcomings in the art.

The apparatus to preserve cluster level serialization during file server serialization reinitialization is provided with a logic unit containing a plurality of modules configured to functionally execute the necessary steps of preserving cluster level serialization during file server serialization reinitialization. These modules in the described embodiments include a local cluster module and a remote cluster module. In a further embodiment, these modules include a permission request module, a completion notification module, an acknowledgement module, and a cluster negotiation module.

The permission request module is configured to communicate a permission request to a remote file server in anticipation of a reinitialization of a local file server. The acknowledgement module, in one embodiment, is configured to acknowledge to the local file server receipt of the permission request by the remote file server. The cluster negotiation module is configured to implement on the remote file server a reinitialization protocol for cluster serialization negotiations during the reinitialization of the local file server. In one embodiment, the reinitialization protocol is different from a standard protocol for cluster serialization negotiations. The completion notification module is configured to notify the remote file server when the reinitialization of the local file server is complete.

In a further embodiment, the cluster negotiation module may be configured according to the reinitialization protocol for cluster serialization negotiations to prohibit the remote file server from modifying a shared storage resource. Alternately, the cluster negotiation module may be configured to prohibit the remote server from updating a shared storage resource during the reinitialization of the local file server. In a further embodiment, the cluster negotiation module may be configured to prohibit the remote server from deleting a shared storage resource during the reinitialization of the local file server. In another embodiment, the cluster negotiation module may be configured to allow the remote server to read a shared storage resource during the reinitialization of the local file server.

A system of the present invention is also presented for preserving cluster level serialization during file server serialization reinitialization. In one embodiment, the system includes a file server cluster including a first file server and a second file server, a reinitialization module configured to initiate a reinitialization of the first file server in response to a serialization failure on the first file server, and a cluster negotiation module to implement on the second file server a reinitialization protocol during the reinitialization of the first file server.

In a further embodiment, the cluster negotiation module also may be configured to prohibit the remote server from updating or deleting a shared storage resource according to the reinitialization protocol during the reinitialization of the first file server. In one embodiment, the shared storage resource may be a file, a directory, a sub-directory, or a directory entry.

A signal bearing medium is also presented herein. In one embodiment, the signal bearing medium tangibly embodies a program of machine-readable instructions executable by a digital processing apparatus to perform operations to preserve cluster level serialization during file server serialization reinitialization. In certain embodiments, the instructions include operations to communicate a permission request to a remote file server in anticipation of a reinitialization of a local file server, implement on the remote file server a reinitialization protocol for cluster serialization negotiations during the reinitialization of the local file server, and notify the remote file server when the reinitialization of the local file server is complete.

In further embodiments of the signal bearing medium, the instructions may include operations to prohibit the remote server from updating a shared storage resource, prohibit the remote server from deleting a shared storage resource, and allow the remote server to read a shared storage resource during the reinitialization of the local file server. The instructions also may include operations to acknowledge to the local file server receipt of the permission request by the remote file server.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
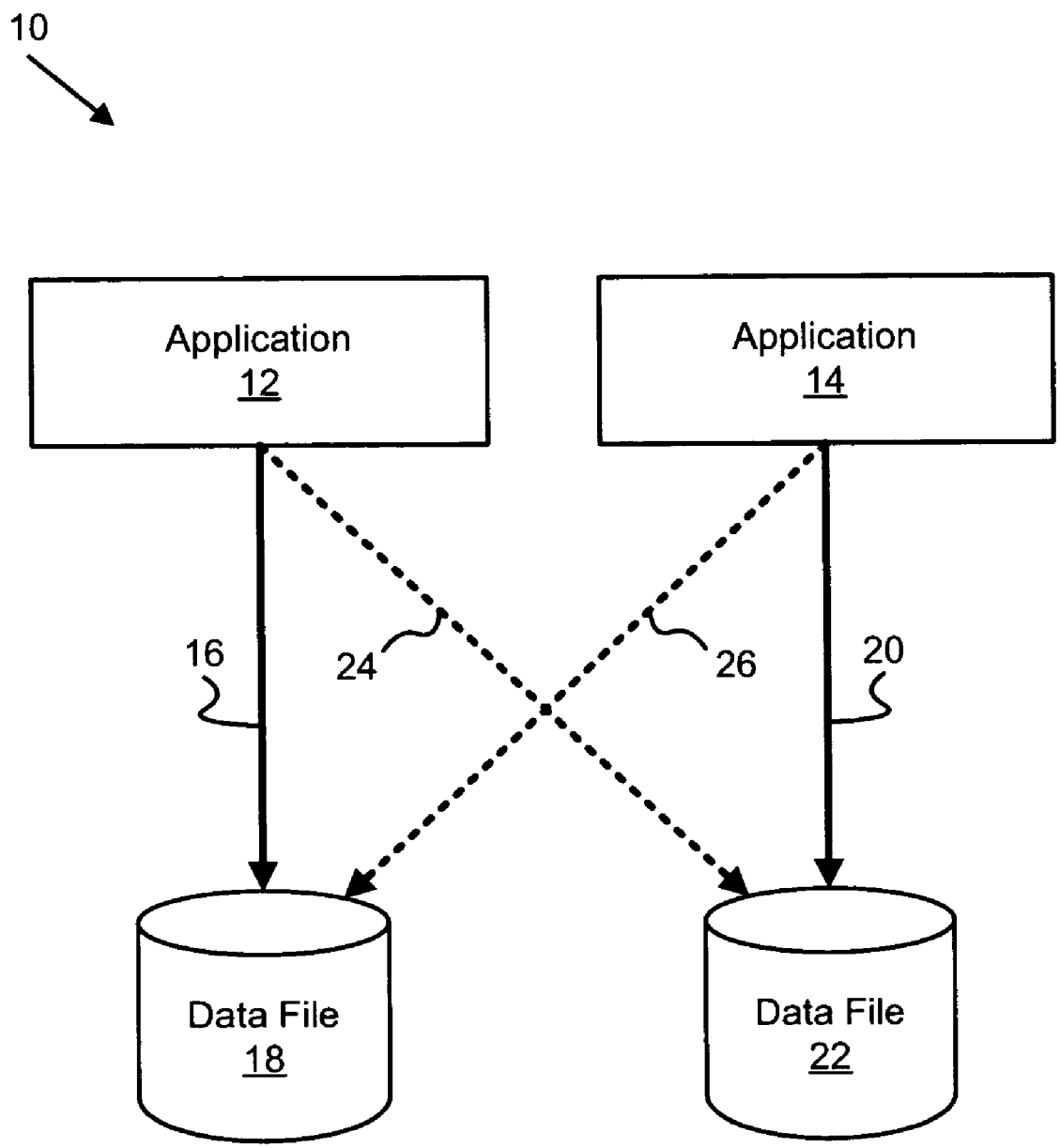
FIG. 1a is a schematic block diagram illustrating one embodiment of an application environment in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1B:
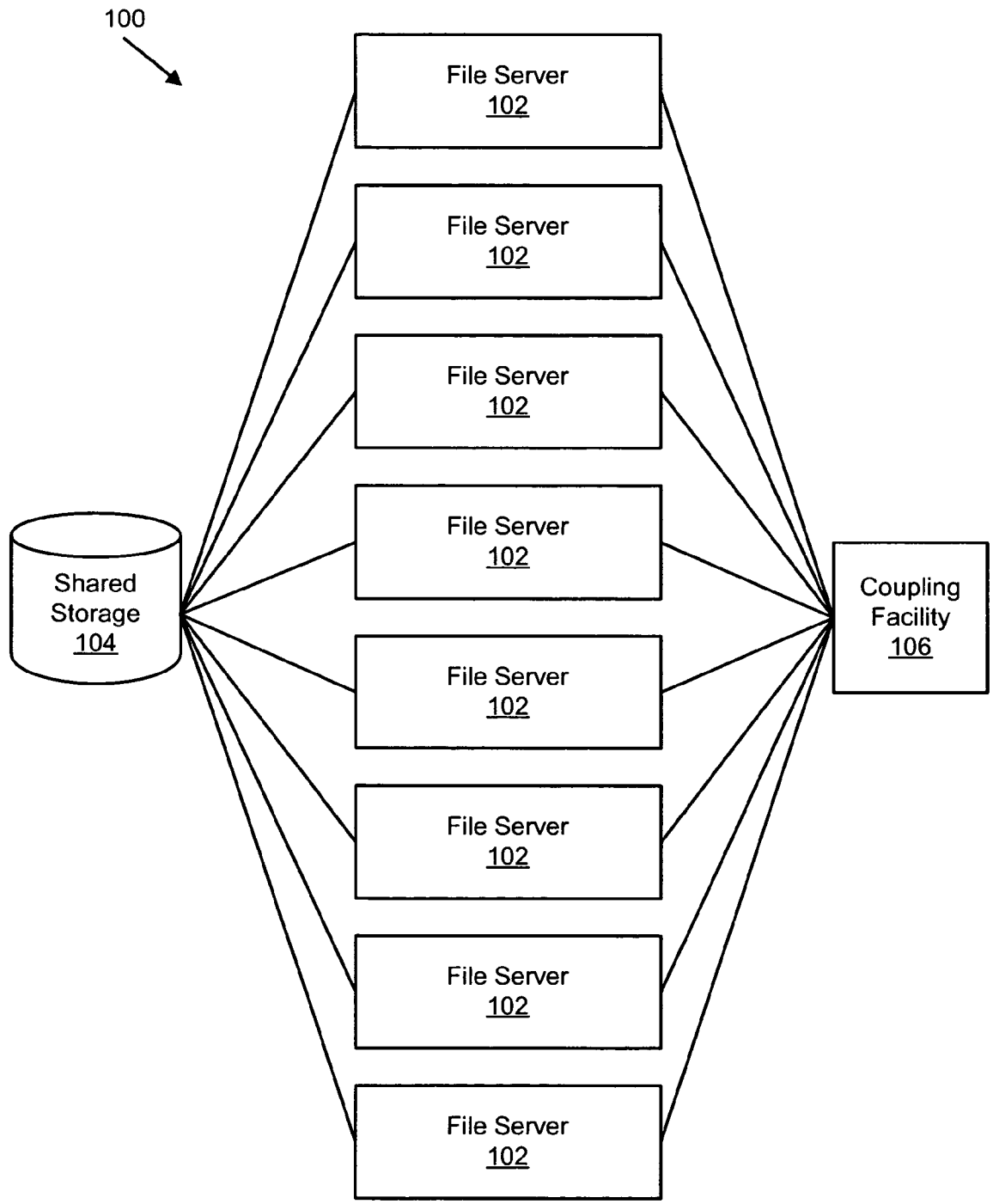
FIG. 1b is a schematic block diagram illustrating one embodiment of a storage system cluster in accordance with the present invention.

FIG. 1b depicts one embodiment of a processing cluster 100 in which certain embodiments of the present invention may be employed. The illustrated processing cluster 100 includes a plurality of file servers 102, one or more shared storage devices 104, and a coupling facility 106. Each file server 102 is configured to manage resources on the processing cluster 100. For example, the plurality of file servers 102 manages allocation of processing, memory, and data storage resources for each application or other software program executing on the processing cluster 100. As used herein, references to an "application" may include application software as well as system software, such as an operating system, unless indicated otherwise.

The shared storage devices 104 comprise electronic storage devices that are configured to store data per instructions from the plurality of file servers 102. In one embodiment, the shared storage devices 104 comprise a plurality of hard disk drives. Alternately, the shared storage devices 104 may comprise one or more optical drives, tape drives, and/or other data storage drives. Data stored on the shared storage devices 104 may be read and otherwise accessed by the file servers 102. In one embodiment, the data on the shared storage devices 104 may be stored within a file system including directories, sub-directories, files, and other directory entries. Each of the directories, sub-directories, files, other directory entries, and similar data structures is a shared storage resource within the processing cluster 100.

Each time an application on one of the file servers 102 requests access to data on one of the shared storage devices 104, the file server 102 coordinates the data access with other client applications running on the same file server 102 and on the other file servers 102 in the processing cluster 100. This coordination is referred to as serialization because the file server 102 allows serial, or consecutive, access to the data on the shared storage 104. Serialization allows each application to have either shared or exclusive access to a particular set of data so that other applications do not interfere with or otherwise disrupt the target set of data.

Serialization may be implemented on various levels of granularity within the processing cluster 100 and shared storage devices 104. For example, serialization may occur at a directory level or a sub-directory level. Additionally, serialization may occur at a file, record, or packet level. The serialization granularity depends on the type of processing cluster 100, file servers 102, shared data storage devices 104, and other hardware used within the processing cluster 100. The granularity also may depend on the type of data access operations that are requested by an application or an operating system.

The coupling facility 106, in one embodiment, is provided to facilitate serialization among all of the file servers 102 within the processing cluster 100. In particular, the coupling facility 106 may store serialization information and assist in messaging operations among the many file servers 102. Alternate embodiments of the processing cluster 100, however, may perform global serialization without the assistance of a coupling facility 106.

Figure 2:
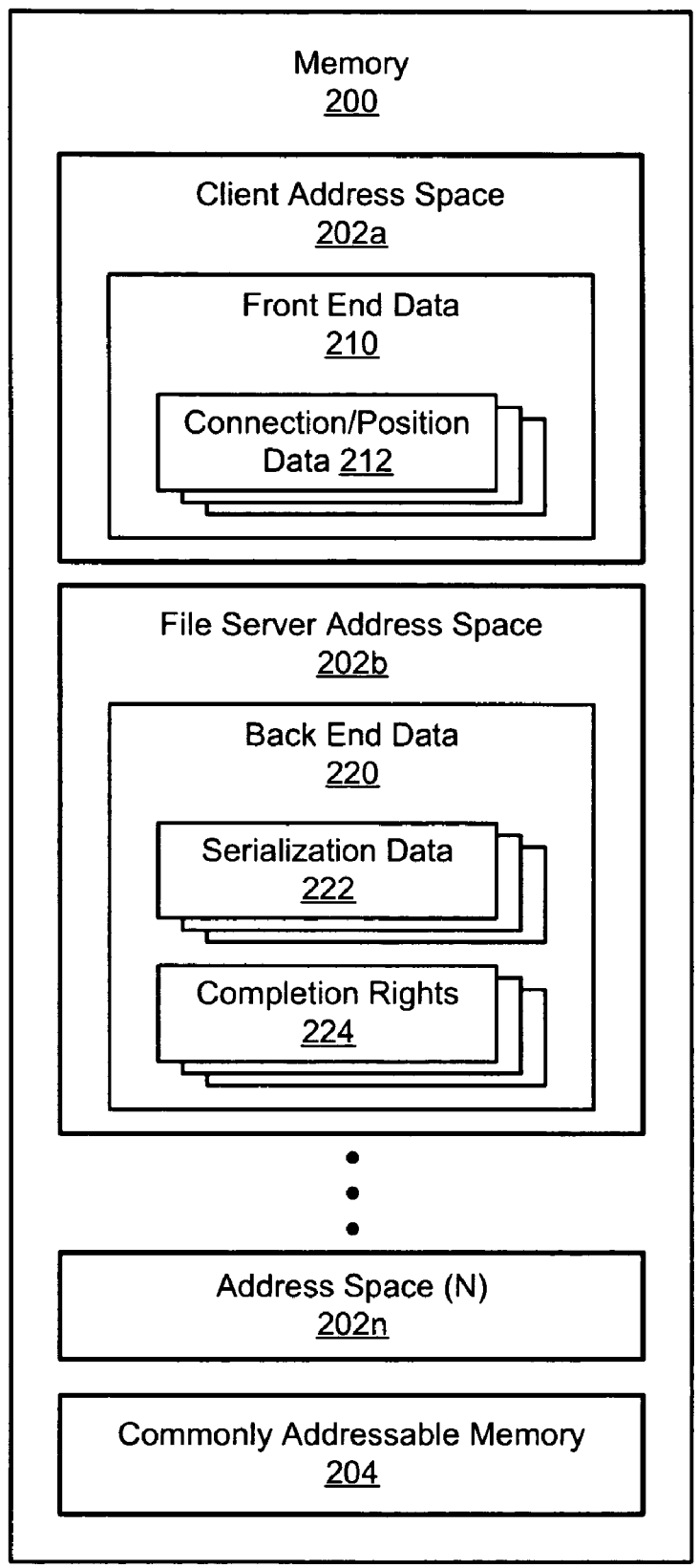
FIG. 2 is a schematic block diagram illustrating one embodiment of an electronic memory device in accordance with the present invention.

FIG. 2 depicts one embodiment of an electronic memory device 200 that may be used to store serialization programs and data, as well as related information. The illustrated memory 200 is divided into a plurality of address spaces 202. Each address space 202 comprises a set of legal memory addresses allocated for a given application and represents the amount of memory 200, either physical or virtual, that is allocated to the application. The illustrated memory 200 specifically includes a client address space 202a, a file server address space 202b, and additional address space(s) 202n. The memory 200 also includes commonly addressable memory 204.

A client address space 202a may be created for each application that interfaces with a given file server 102. For instance, a memory 200 may include four client address spaces 202a, one for each of four clients interfacing with the file server 102. The client address space 202a also may be referred to as the "front end" because it is responsible for interacting directly with the application programs. In general, the client address space 202a facilitates data access operations for the requesting software program, such as application software or system software.

The illustrated client address space 202a includes front end data 210, generally, and specifically includes connection/position data 212. Each client address space 202a may contain corresponding front end data 210, including connection/position data 212, pertinent to the associated client. The connection/position data is descriptive of the data on the shared storage devices 104 that is accessed by the corresponding application. An example of connection/position data 212 is described in more detail with reference to FIG. 3a.

References throughout this description to "a" or "the" client address space 202a in singular form is understood to refer to one or more client address spaces 202a, where each client address space 202a corresponds to an independent client. Similarly, references to front end data 210 and/or connection/position data 212 is understood to refer to such data for one or more clients interfacing with a given file server 102.

The file server address space 202b, in one embodiment, is responsible for serialization within the file server 102 and for data access to the shared storage devices 104. The file server address space 202b also may be referred to as the "back end" because it manages the interface between the file server 102 and the shared storage devices 104. In particular, the file server address space 202b serializes the data access requests for the application corresponding to the associated client address space 202a. These data access requests are serialized with other data access requests from other applications serviced by the same file server 102 and other file servers 102 within the processing cluster 100.

The illustrated file server address space 202b includes back end data 220, generally, and specifically includes serialization data 222. In further embodiments, the back end data 220 also may include completion rights 224, which may indicate the processing status of a data access request and/or the stability of the connection/position data 212 stored in the client address space 202a.

The additional address space(s) 202n may be used for similar programs and data as those stored in the client address space 202a and the file server address space 202b. The additional address space(s) 202n also may include a master address space, and so forth, as is currently known in the art.

The commonly addressable memory 204 is a portion of the memory 200 that may be used to store programs and data that are commonly accessible by one or more address spaces 202. For instance, the commonly addressable memory 204 may be used to store data, such as file names, or metadata that is commonly referenced by both the connection/position data 212 in the client address space 202a and the serialization data 222 in the file server address space 202b.

Figure 3A:
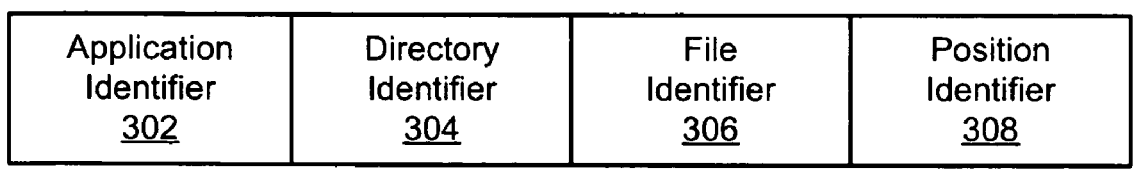
FIG. 3a is a schematic block diagram illustrating one embodiment of connection/position data in accordance with the present invention.

FIG. 3a depicts one embodiment of connection/position data 300 that is substantially similar to the connection/position data 212 described with reference to FIG. 2. The connection/position data 300 includes several fields that are each configured to store an identifier or other data to describe the connection and position information that is associated with a data access request corresponding to a particular application. The connection/position data 300 also may be referred to herein as connection/position information or connection/position records.

The illustrated connection/position data 300 includes an application identifier field 302, a directory identifier field 304, a file identifier field 306, and a position identifier field 308. In a further embodiment, the connection/position data 300 may include fewer or more data and/or metadata fields. In one embodiment, the application identifier field 302 stores an application identifier that identifies the application for which the client address space 202a exists.

The directory identifier field 304 stores a directory identifier that identifies a directory on the shared storage devices 104 that is being used for operations associated with the application identified by the application identifier. Similarly, the file identifier field 306 stores a file identifier that identifies a file that is being used for data access operations associated with the same application. In certain embodiments, the file identifier may relate to the directory identifier in that the file is a member of the directory. Given this relationship, the file identifier also may be referred to as a member identifier. The directory identifier and the file identifier may generally be referred to as resource identifiers. In alternate embodiments of the invention, other resource identifier fields and resource identifiers may be present within the connection/position data 300.

The position identifier field 308, in one embodiment, stores a position identifier that identifies the position at which the file or storage resource is currently or most recently accessed. In one embodiment, the position identifier may comprise a byte offset that indicates the current read or write position by a number of bytes from the beginning of the file that is being accessed.

Figure 3B:
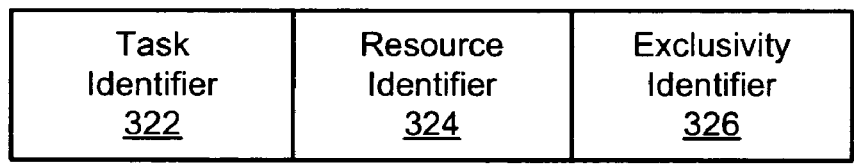
FIG. 3b is a schematic block diagram illustrating one embodiment of serialization data in accordance with the present invention.

FIG. 3b depicts one embodiment of serialization data 320 that is substantially similar to the serialization data 222 described above with reference to FIG. 2. The serialization data 320 includes several fields that are each configured to store an identifier or other data to describe the serialization information that is associated with a data access request corresponding to a particular task. A task is one data access operation that is associated with a particular application. An application may generate one or many tasks. The serialization data 320 also may be referred to herein as serialization information or serialization records.

The illustrated serialization data 320 includes a task identifier field 322, a resource identifier field 324, and an exclusivity identifier field 326. In a further embodiment, the serialization data 320 may include fewer or more data and/or metadata fields. In one embodiment, the task identifier field 322 stores a task identifier that identifies the task that is executed within the file server address space 202b.

In one embodiment, the resource identifier field 324 stores a resource identifier that identifies either an input resource or an output resource associated the task identified by the task identifier. In one embodiment, the resource identifier may identify an input resource, such as a shared storage device 104, from which data may be input into the task operation. For instance, the task operation may read data from a shared storage device 104. In a further embodiment, the resource identifier may identify an output resource, such as a buffer or an output area on disk, to which data may be sent according to the task operation.

The exclusivity identifier field 326 stores an exclusivity identifier that identifies the type of resource exclusivity provided for the identified task to the identified resource. For example, the task may have either shared or exclusive read access to a target data set to be read from the shared storage devices 104. In many instances, though not all, the exclusivity identifier provides shared access for data read (input) operations. In a further example, the task may have exclusive write access to a target buffer on which data may be written. In many instances, though not all, the exclusivity identifier provides exclusive access for data write (output) operations.

Figure 4:
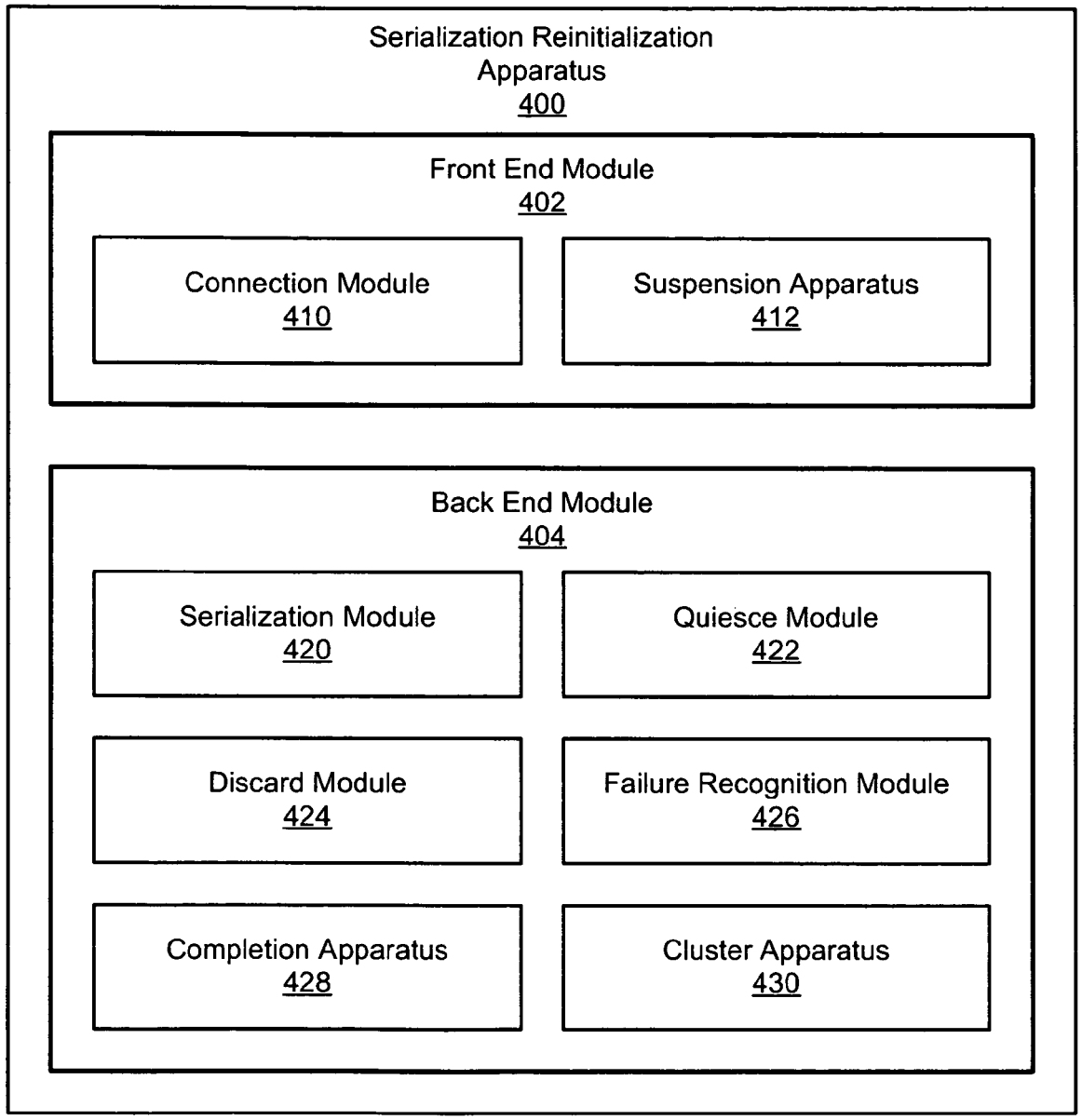
FIG. 4 is a schematic block diagram illustrating one embodiment of a serialization reinitialization apparatus in accordance with the present invention.

FIG. 4 depicts one embodiment of a serialization reinitialization apparatus 400 that may be used in conjunction with various embodiments of the present invention. The illustrated serialization reinitialization apparatus 400 includes a front end module 402 and a back end module 404. In one embodiment, the front end module 402 and the back end module 404 are software programs that reside in the client address space 202a and file server address space 202b, respectively.

The serialization reinitialization apparatus 400 is configured to reinitialize the serialization data 222 of the file server 102 in response to a serialization error or failure. As described above, a serialization failure may occur when one or more applications cannot properly access stored data that is necessary for completion of an operation. For example, referring back to FIG. 1, a file server 102 may be waiting for a first application 12 having exclusive access rights to a data file 18 to conclude an operation before allowing a second application 14 to have access rights to the same data file 18.

When serialization data 222 within a file server 102 or among a plurality of file servers 102 within a processing cluster 100 fails, the file server 102 or processing cluster 100 may become unavailable. For example, a file server 102 may become nonresponsive or "deadlocked" when two applications 12, 14 attempt to access data that is exclusively reserved for each other. By reinitializing the serialization data 222 of the file server 102, the serialization reinitialization apparatus 400 discards the existing serialization information 222 and reconstructs new serialization information from the connection/position data 212, thereby correcting any serialization failures.

Referring back to FIG. 4, the front end module 402, in one embodiment, includes a connection module 410 and a suspension apparatus 412. The connection module 410 is configured to monitor and record the connection/position data 212 for each task associated with an application. The suspension apparatus 412 is configured, in one embodiment, to suspend data access requests while the serialization data 222 for the file server 102 is being reinitialized. In one embodiment, the suspension apparatus 412 suspends the data access requests during a quiesce period prior to the serialization reinitialization, as well as during the serialization reinitialization.

The back end module 404, as illustrated, includes a serialization module 420, a quiesce module 422, a discard module 424, a failure recognition module 426, a completion apparatus 428, and a cluster apparatus 430. The serialization module 420, in one embodiment, is configured to manage the serialization data 222 for the file server 102. Additionally, the serialization module 420 may rebuild the serialization data 222 from the connection/position data 212 in conjunction with a serialization reinitialization of the file server 102.

The quiesce module 422 is configured, in one embodiment, to define and implement a quiesce period prior to a reinitialization of the serialization data 222 of the file server 102. In certain embodiments, the quiesce period may be a few seconds. Alternately, the quiesce period may be longer or shorter than a few seconds. During the quiesce period, the back end module 404 may deny new data access requests from the front end module 402. Additionally, the quiesce period may be used to allow ongoing tasks to complete prior to serialization reinitialization. Furthermore, ongoing tasks may be suspended or otherwise postponed during the quiesce period in order to maintain the integrity of the connection/position data 212 stored in the client address space 202a.

The discard module 424, in one embodiment, is configured to discard the existing serialization data 222 in conjunction with a serialization reinitialization of the file server 102. In certain embodiments, for example, the discard module 424 may request that the operating system simply destroy all of the information, programs, and data stored in the file server address space 202b, or back end. In other words, the operating system may be invoked to delete the back end data 220, including the existing serialization data 222 and the completion rights 224. Furthermore, the operating system may entirely discard the back end module 404, including the serialization module 420, the quiesce module 422, the discard module 424, the failure recognition module 426, the completion apparatus 428, and the cluster apparatus 430. Each of these back end modules, apparatuses, and data may be rebuilt during the serialization reinitialization.

The failure recognition module 426 is configured, in one embodiment, to recognize a serialization failure within the file server 102. In a further embodiment, the failure recognition module 426 may recognize a global serialization failure, for example in conjunction with the coupling facility 106. In an alternate embodiment, a human operator may recognize a situation in which the file server 102 is nonresponsive and explicitly issue a command on a system console keyboard (not shown) to initiate the reinitialization process. In this case, the operator may use diagnostic aids to help make such a determination.

The completion apparatus 428 is configured, in one embodiment, to track the completion progress of a task. In one embodiment, the completion apparatus 428 may create and use the completion rights 224 within the back end data 220 to track the progress of a task. The cluster apparatus 430, in one embodiment, is configured to manage communication and operations of the processing cluster 100 during serialization reinitialization of one of the plurality of file servers 102. One example of a cluster apparatus 430 is described in more detail with reference to FIG. 5.

Figure 5:
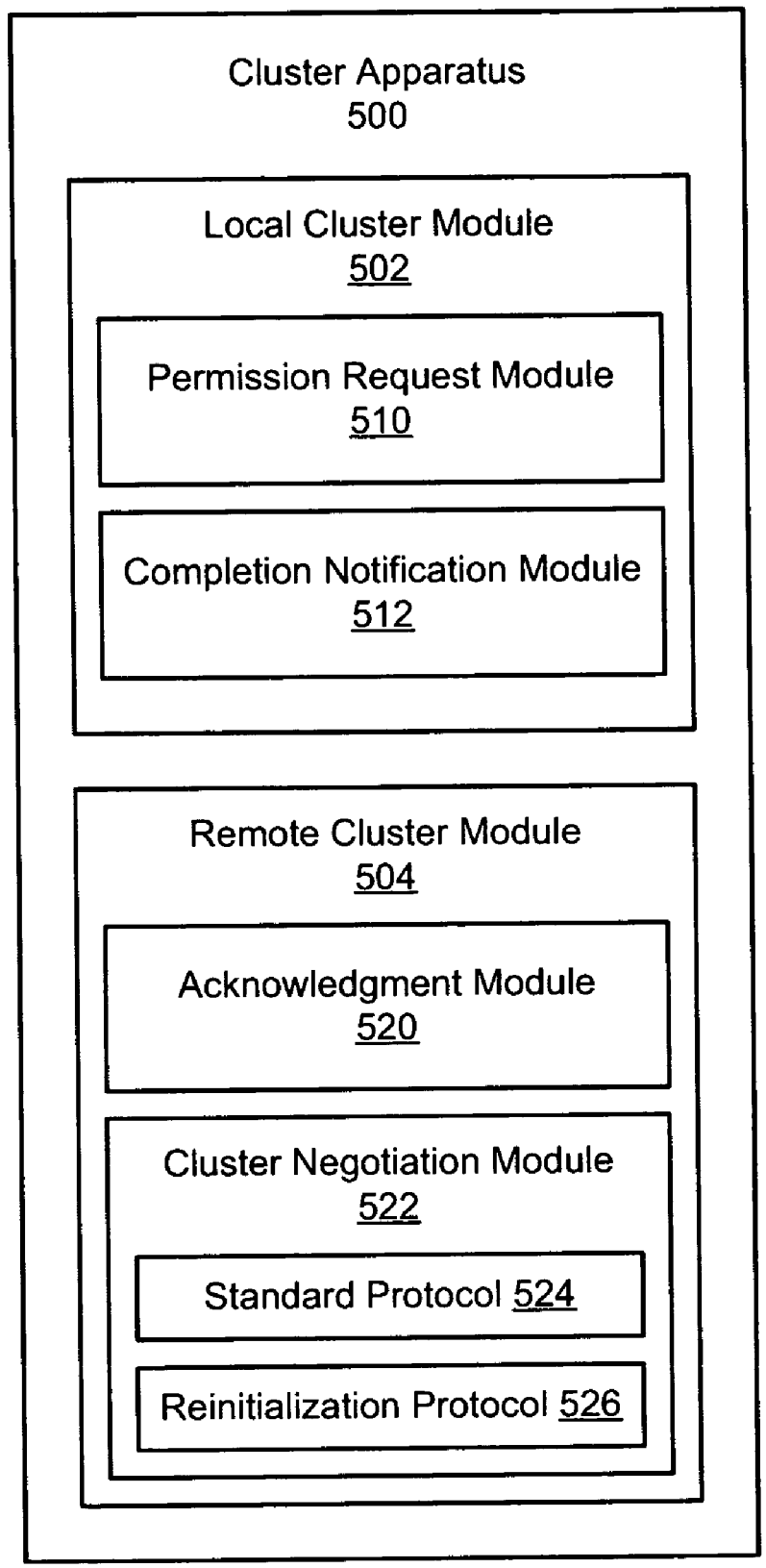
FIG. 5 is a schematic block diagram illustrating one embodiment of a cluster apparatus in accordance with the present invention.

FIG. 5 depicts one embodiment of a cluster apparatus 500 that is substantially similar to the cluster apparatus 430 of FIG. 4. The illustrated cluster apparatus 500 includes a local cluster module 502 and a remote cluster module 504. In turn, the local cluster module 502 includes a permission request module 510 and a completion notification module 512. Similarly, the remote cluster module 504 includes an acknowledgement module 520 and a cluster negotiation module 522. In one embodiment, the cluster negotiation module 522 also includes a standard protocol 524 and a reinitialization protocol 526. Alternately, the standard protocol 524 and reinitialization protocol 526 may be stored in memory 200 or another storage location that is accessible by the cluster negotiation module 522.

In one embodiment, the cluster apparatus 500 is located in the back end module 404 so that it is destroyed when the back end module 404 is destroyed during the reinitialization process. Alternately, the cluster apparatus 500 may be located in the front end module 402 or in another address space 202n within the memory 200.

Each file server 102 within a processing cluster 100 may be reinitialized if a serialization error occurs on that file server 102. When one file server 102 is reinitialized, that file server 102 may be referred to as a local file server 102. Each of the remaining file servers 102 that are not reinitialized may be referred to as a remote file server 102. Other naming conventions may be employed to distinguish between a reinitialized file server 102 and non-reinitialized file servers 102 within the processing cluster 100 without deviating from the understanding of the present invention.

For a given file server 102, the local cluster module 502 may be invoked when the file server 102 is a local file server 102 and is reinitialized. Alternately, the remote cluster module 504 may be invoked when the file server 102 is a remote file server 102 and is not reinitialized.

In one embodiment, the permission request module 510 communicates a reinitialization notification from a local file server 102 to each of the remote file servers 102. A reinitialization notification also may be referred to as a permission request. The permission request module 510 sends the reinitialization notification so that all of the remote file servers 102 may be aware that a serialization failure has occurred on the local file server 102 and that the local file server 102 anticipates a reinitialization. Similarly, the completion so, notification module 512 is configured, in one embodiment, to send a completion notification from the local file server 102 to each of the remote file servers 102 within the processing cluster 100 to notify the remote file servers 102 that a reinitialization has occurred on the local file server 102 and is complete.

The acknowledgement module 520 is configured, in one embodiment, to send and acknowledgement notification from a remote file server 102 to a local file server 102 in response to a reinitialization notification from the local file server 102. By sending the acknowledgment notification, the remote cluster module 504 recognizes that the local file server 102 will be reinitializing and that the remote file server 102 needs to implement certain procedures in order to preserve the cluster level serialization throughout the processing cluster 100.

The cluster negotiation module 522, in one embodiment, is configured to negotiate with the other file servers 102 in the processing cluster 100 in order to properly serialize data access to the shared storage devices 104. In one embodiment, the cluster negotiation module 522 may use the standard negotiation protocol 524 to negotiate with the other file servers 102. In another embodiment, when a file server 102 within the processing cluster 100 is reinitializing, the cluster negotiation module 522 may use the reinitialization negotiation protocol 526.

In one embodiment, the reinitialization protocol 526 may include a variety of specific rules that may be implemented depending on the type of data access rights that are sought by non-reinitializing file servers 102 during the time that a local file server 102 is being reinitialized. In a further embodiment, the reinitialization protocol 526 also may define specific rules that may be implemented during a quiesce phase preceding reinitialization of the local file server 102. Table 5.1 below provides one example of the reinitialization protocol 526 that may be implemented by the cluster negotiation module 522 during the quiesce and reinitialization phases. Alternate embodiments of part or all of the reinitialization protocol 526 may be implemented instead of or in addition to the reinitialization protocol 526 shown in Table 5.1.

The following schematic flow chart diagrams are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
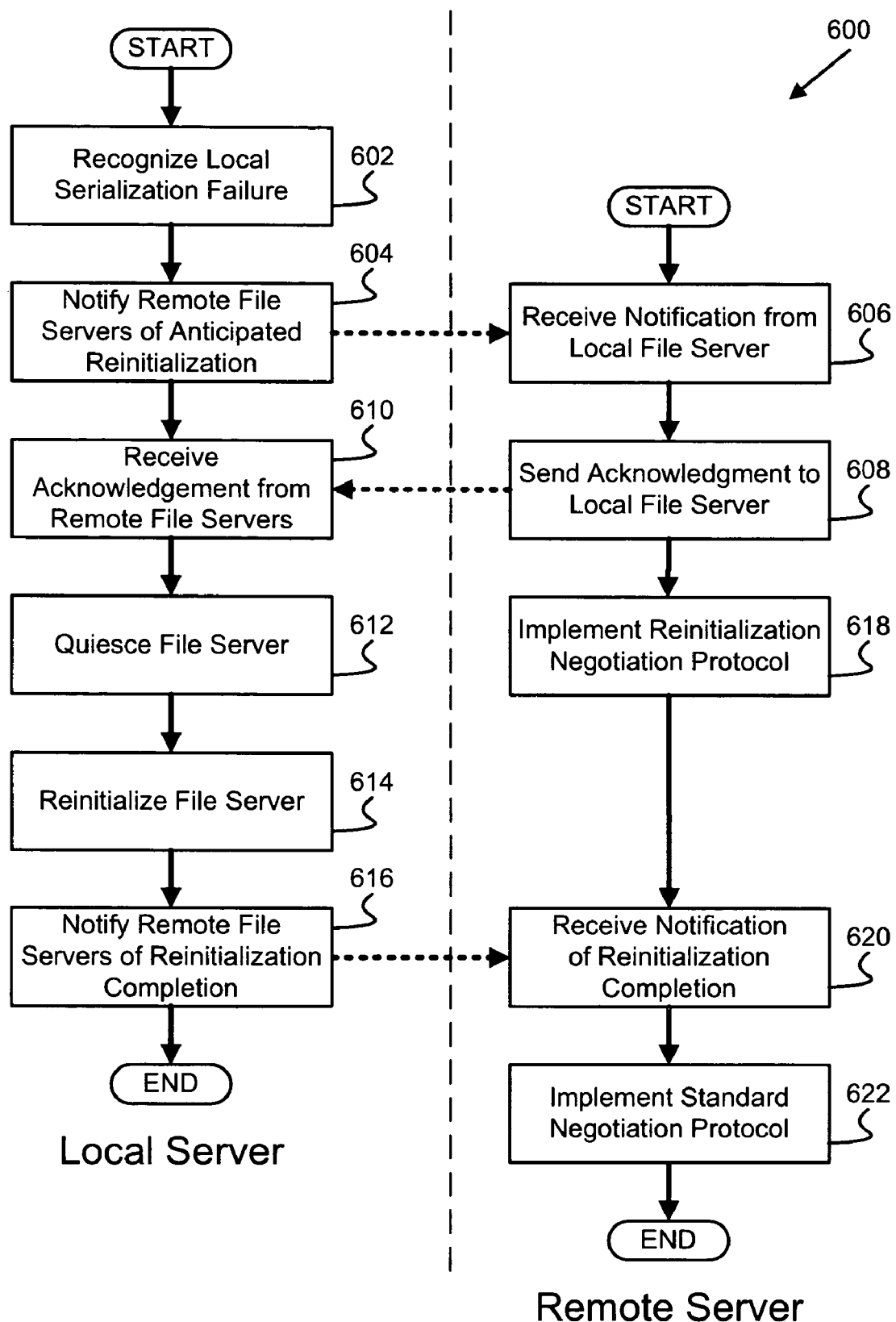
FIG. 6 is a schematic flow chart diagram illustrating one embodiment of a cluster method in accordance with the present invention.

FIG. 6 depicts a cluster method 600 that may be employed by the serialization reinitialization apparatus 400 of FIG. 4 and the cluster apparatus 500 of FIG. 5. It should be noted that the present description of the cluster method 600 references a local file server 102 and a remote file server 102. As described above, the local file server 102 is characterized by the occurrence of a serialization failure and reinitialization of the serialization data 222 on the local file server 102. The remote file server 102 is identified as any other file server 102 within the same processing cluster 100 that is not reinitialized at the time the local file server 102 is reinitialized. The presently described embodiments presume that there is no serialization failure on the remote file server 102 during the quiesce and

TABLE 5.1

Reinitialization Protocol during Quiesce and Reinitialization Phases

| Resource | Serialization Right | Exclusivity of Right | Phase | Rule Governing Non-Reinitializing File Servers |
|---|---|---|---|---|
| File System Dir | Update | Exclusive | Normal Processing | Negotiate according to Standard Protocol |
| | | | Quiesce and Reinitialization | Negotiate with other Non-Reinitializing File Servers according to Reinitialization Protocol (Reinitializing File Server is assumed to have no file system dir update rights) |
| | Read | Non-Exclusive | Normal Processing | Negotiate according to Standard Protocol |
| | | | Quiesce and Reinitialization | Negotiate with other Non-Reinitializing File Servers according to Reinitialization Protocol (Reinitializing File Server is assumed to have no file system dir update rights) |
| File | Update | Exclusive | Normal Processing | Negotiate according to Standard Protocol |
| | | | Quiesce and Reinitialization | Not Available according to Reinitialization Protocol (Reinitializing file server is assumed to have non-exclusive file read rights) |
| | Read | Non-Exclusive | Normal Processing | Negotiate according to Standard Protocol |
| | | | Quiesce and Reinitialization | Negotiate with other Non-Reinitializing File Servers according to Reinitialization Protocol (Reinitializing file server is assumed to have non-exclusive file read rights) | reinitializing periods described herein. However, certain embodiments may be implemented in which a serialization failure might occur on one or more remote file servers 102.

In one embodiment, each of the local file server 102 and the remote file server 102 has a corresponding cluster apparatus 500. As described above, in certain embodiments, the local file server 102 may invoke the local cluster module 502 and the remote file server 102 may invoke the remote cluster module 504.

The illustrated cluster method 600 begins when the failure recognition module 426 on the local file server 102 recognizes 602 a serialization failure on a local file server 102. The permission request module 510 on the local file server 102 then notifies 604 the remote file servers 102 that the local file server 102 anticipates reinitializing its serialization data 222. The remote file servers 102 receive 606 the notification from the local file server 102 and, in response, sends 608 an acknowledgement to the local file server 102. In one embodiment, the acknowledgement module 520 of each of the remote file servers 102 sends 608 the acknowledgement. At this point, the local file server 102 and the remote file servers 102 are aware that the local file server 102 is going to be non-participating for a time with regard to the cluster level serialization.

The local file server 102 subsequently receives 610 the acknowledgement from the remote file server 102 and quiesces 612 the local file server 102 and reinitializes 614 the serialization data 222 on the local file server 102. After the serialization data 222 on the local file server 102 is reinitialized 614, the completion notification module 512 sends 616 a completion notification to the remote file server 102 to indicate that the local file server 102 is reinitialized and once again available within the processing cluster 100.

After the acknowledgement module 520 sends 608 the acknowledgement from the remote file server 102 to the local file server 102, the cluster negotiation module 522 on the remote file server 102 implements 618 a reinitialization negotiation protocol 526, as described above. The reinitialization negotiation protocol 526, in one embodiment, sets forth the negotiation rules that define the availability of data access rights for the remote file servers 102 while the local file server 102 is quiesced 612 and reinitialized 614. After the local file server 102 is reinitialized 614, the remote file server 102 receives 620 the completion notification from the local file server 102 and implements 622 the standard negotiation protocol 524. The depicted cluster method 600 then ends.

Advantageously, the cluster apparatus 500 and cluster method 600 preserve the serialization rights (data access rights) of the reinitialized file server 122 while the file system serialization information 222 is reinitialized. Furthermore, the cluster apparatus 500 and cluster method 600 implement a reinitialization protocol 526 in all remote file servers 102, where the reinitialization protocol 526 preserves the serialization rights of the reinitialized file server 102 during the time that it is quiescing and reinitializing. In this way, the cluster apparatus 500 allows the serialization reinitialization apparatus 400 to be used in a processing cluster 100 of file servers 102 with little or no risk of corruption of shared data due to improper simultaneous access. In other words, the cluster apparatus 500 and cluster method 600 beneficially provide automated reinitialization negotiation among the remote file servers 102 within a processing cluster 100 without risking the integrity of shared data resources 104.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to preserve cluster level serialization during file server serialization reinitialization, the apparatus comprising:

a permission request module configured to communicate a permission request to a remote file server in anticipation of a reinitialization of a local file server, wherein the local file server, during the reinitialization, is unavailable to accept data access requests to modify shared resources;

a cluster negotiation module configured to implement on the remote file server a reinitialization protocol for cluster level serialization negotiations during the reinitialization of the local file server, the reinitialization protocol assigning data access rights to the local file server to preserve serialization rights of the local file server during cluster level serialization negotiations while the local file server is being reinitialized and is unable to directly participate in cluster level serialization negotiations; and a completion notification module configured to notify the remote file server of a completion of the reinitialization of the local file server, wherein all or a portion of the permission request module, the cluster negotiation module, and the completion notification module comprise one or more of logic hardware and executable code, the executable code stored on one or more computer readable storage media.

2. The apparatus of claim 1, wherein the cluster negotiation module is further configured according to the reinitialization protocol to prohibit the remote server from updating a shared storage resource during the reinitialization of the local file server.

3. The apparatus of claim 1, wherein the cluster negotiation module is further configured according to the reinitialization protocol to prohibit the remote server from deleting a shared storage resource during the reinitialization of the local file server.

4. The apparatus of claim 1, wherein the cluster negotiation module is further configured according to the reinitialization protocol to allow the remote server to read a shared storage resource during the reinitialization of the local file server.

5. The apparatus of claim 1, further comprising an acknowledgement module configured to acknowledge to the local file server receipt of the permission request by the remote file server.

6. The apparatus of claim 1, wherein the cluster negotiation module is further configured to discontinue on the remote file server the reinitialization protocol for cluster serialization negotiations after completion of the reinitialization of the local file server.

7. The apparatus of claim 1, wherein the reinitialization protocol for cluster serialization negotiations comprises a rule descriptive of a data access fight possessed by the local file server during the reinitialization of the local file server.

8. The apparatus of claim 1, wherein the reinitialization protocol for cluster serialization negotiations comprises a rule descriptive of a data access fight possessed by the remote file server during the reinitialization of the local file server.

9. A system to preserve cluster level serialization during file server serialization reinitialization, the system comprising:

a file server cluster comprising a local file server and a remote file server;

a reinitialization module configured to initiate a reinitialization of the local file server in response to a serialization failure on the local file server, wherein the local file server, during the reinitialization, is unavailable to accept data access requests to modify shared resources; and a cluster negotiation module to implement on the remote file server a reinitialization protocol during the reinitialization of the local file server, the reinitialization protocol assigning data access rights to the local file server to preserve serialization rights of the local file server during cluster level serialization negotiations while the local file server is being reinitialized and is unable to directly participate in cluster level serialization negotiations, wherein all or a portion of the reinitialization module and the cluster negotiation module comprise one or more of logic hardware and executable code, the executable code stored on one or more computer readable storage media.

10. The system of claim 9, wherein the cluster negotiation module is further configured according to the reinitialization protocol to prohibit the remote server from updating a shared storage resource during the reinitialization of the local file server.

11. The system of claim 10, wherein the shared storage resource comprises a resource selected from one of a file, a directory, a sub-directory, and a directory entry.

12. The system of claim 9, wherein the cluster negotiation module is further configured according to the reinitialization protocol to allow the remote server to read a shared storage resource during the reinitialization of the local file server.

13. The system of claim 9, wherein the reinitialization protocol comprises a rule descriptive of a data access fight possessed by the local file server during the reinitialization of the local file server.

14. A computer readable storage medium tangibly embodying a program of machine-readable instructions executable by a digital processing apparatus to perform operations to preserve cluster level serialization during file server serialization reinitialization, the instructions comprising operations to:

communicate a permission request to a remote file server in anticipation of a reinitialization of a local file server, wherein the local file server, during the reinitialization, is unavailable to accept data access requests to modify shared resources;

implement on the remote file server a reinitialization protocol for cluster level serialization negotiations during the reinitialization of the local file server, the reinitialization protocol assigning data access rights to the local file server to preserve serialization rights of the local file server during cluster serialization negotiations while the local file server is being reinitialized and is unable to directly participate in cluster level serialization negotiations; and notify the remote file server of a completion of the reinitialization of the local file server.

15. The computer readable storage medium of claim 14, wherein the instructions further comprise operations to prohibit the remote server according to the reinitialization protocol from updating a shared storage resource during the reinitialization of the local file server and during a quiesce period preceding the reinitialization of the local file server, the quiesce period comprising a predetermined period of time prior to the reinitialization of the local file server to allow ongoing tasks to complete.

16. The computer readable storage medium of claim 14, wherein the instructions further comprise operations to prohibit the remote server according to the reinitialization protocol from deleting a shared storage resource during the reinitialization of the local file server.

17. The computer readable storage medium of claim 14, wherein the instructions further comprise operations to allow the remote server according to the reinitialization protocol to read a shared storage resource during the reinitialization of the local file server.

18. The computer readable storage medium of claim 14, wherein the instructions further comprise operations to acknowledge to the local file server receipt of the permission request by the remote file server.

19. The computer readable storage medium of claim 14, wherein the instructions further comprise operations to discontinue on the remote file server the reinitialization protocol for cluster serialization negotiations after completion of the reinitialization of the local file server.

* * * * *